United States Patent
Nichols et al.

(10) Patent No.: US 9,934,605 B2
(45) Date of Patent: Apr. 3, 2018

(54) DEPTH BUFFERING FOR SUBSEQUENT SCENE RENDERING

(71) Applicant: Disney Enterprises, Inc., Burbank, CA (US)

(72) Inventors: Gregory Nichols, North Hollywood, CA (US); Brent Burley, Monterey Park, CA (US); Ralf Habel, Toluca Lake, CA (US); David Adler, Valley Glen, CA (US)

(73) Assignee: Disney Enterprises, Inc., Burbank, CA (US)

( * ) Notice: Subject to any disclaimer, the term of this patent is extended or adjusted under 35 U.S.C. 154(b) by 38 days.

(21) Appl. No.: 15/052,694

(22) Filed: Feb. 24, 2016

(65) Prior Publication Data

US 2017/0243393 A1    Aug. 24, 2017

(51) Int. Cl.
*G06T 15/40* (2011.01)
*G06T 1/60* (2006.01)

(52) U.S. Cl.
CPC .............. *G06T 15/405* (2013.01); *G06T 1/60* (2013.01)

(58) Field of Classification Search
None
See application file for complete search history.

(56) References Cited

U.S. PATENT DOCUMENTS

| | | | |
|---|---|---|---|
| 6,760,024 B1 | 7/2004 | Lokovic | |
| 9,607,426 B1* | 3/2017 | Peterson | G06T 15/06 |
| 2006/0022976 A1* | 2/2006 | Bredow | G06T 13/60 |
| | | | 345/422 |
| 2007/0035544 A1* | 2/2007 | Fossum | G06T 15/06 |
| | | | 345/422 |
| 2012/0257795 A1* | 10/2012 | Kim | H04N 13/0022 |
| | | | 382/106 |

* cited by examiner

*Primary Examiner* — Kyle Zhai
(74) *Attorney, Agent, or Firm* — Farjami & Farjami LLP

(57) ABSTRACT

There is provided a scene rendering system and method for use by such a system to perform depth buffering for subsequent scene rendering. The system includes a memory storing a depth determination software including a reduced depth set identification software module, and a hardware processor configured to execute the depth determination software. The hardware processor is configured to execute the depth determination software to determine, before rendering a scene, a depth buffer based on at least one fixed depth identified for each element of a rendering framework for the scene. The hardware processor is further configured to render the scene using the depth buffer.

18 Claims, 3 Drawing Sheets

DEPTH BUFFERING FOR SUBSEQUENT SCENE RENDERING

BACKGROUND

In rendering a scene including deep images, a scene rendering system may utilize a ray tracer in order to accumulate multiple shading samples into the correct depth sample for each shading point. Because the rendering system typically lacks prior knowledge of the number of depth samples that a particular pixel of the rendered scene should have, this process often requires that many rays be traced for each pixel, and that the rendering system dynamically adapt to the results of the ray tracing.

Unfortunately, such an approach introduces considerable complexity and imposes significant processing and data storage costs. For example, all or parts of a depth buffer used to render the scene may need to be locked and resized during the rendering. Moreover, substantial additional data handling is required in order to correctly accumulate shading samples when the depth buffer layout is being modified dynamically. As an added disadvantage, such an approach fails to enable artistic control over the rendered scene in situations in which some portions of the deep images might be enhanced by using more or fewer depth samples than the rendering system accumulates.

SUMMARY

There are provided systems and methods for performing depth buffering for subsequent scene rendering, substantially as shown in and/or described in connection with at least one of the figures, and as set forth more completely in the claims.

DETAILED DESCRIPTION

Figure 1:
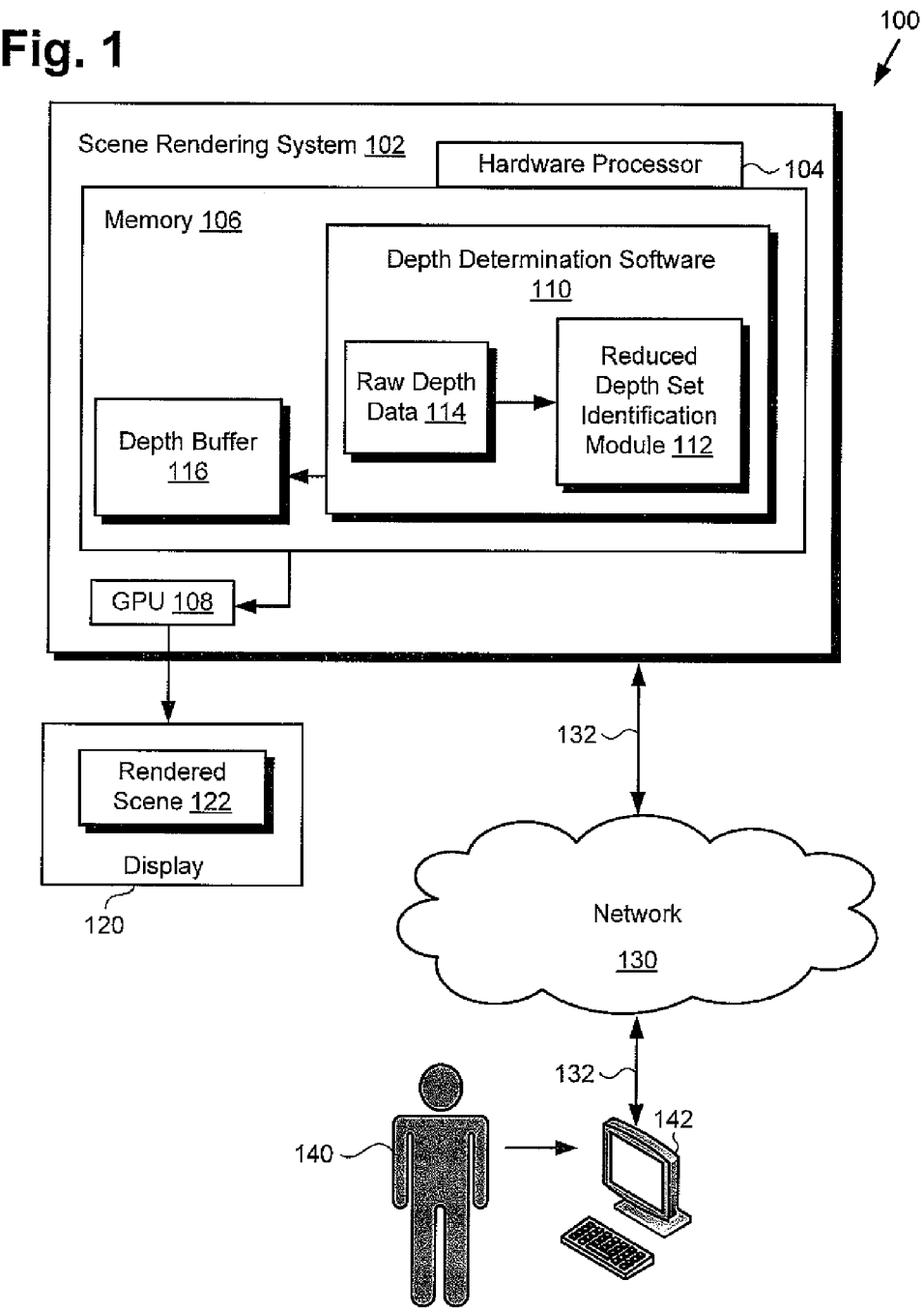
FIG. 1 shows a diagram of one exemplary implementation of a scene rendering system configured to perform depth buffering and subsequent scene rendering.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of one exemplary implementation of a scene rendering system configured to perform depth buffering and subsequent scene rendering. As shown in FIG. 1, rendering environment 100 includes scene rendering system 102, communication network 130, display 120 for providing rendered scene 122, workstation terminal 142, and artist or user 140 utilizing workstation terminal 142. As further shown in FIG. 1, scene rendering system 102 includes hardware processor 104, optional graphics processing unit (GPU) 108, and system memory 106 implemented as a non-transitory storage device. According to the present exemplary implementation, system memory stores depth determination software 110 including reduced depth set identification software module 112 and raw depth data 114, as well as depth buffer 116. Also shown in FIG. 1 are network communication links 132 interactively connecting workstation terminal 142 and scene rendering system 102 via communication network 130.

It is noted that although FIG. 1 depicts depth determination software 110 and depth buffer 116 as being mutually co-located in memory 106, that representation is merely provided as an aid to conceptual clarity. More generally, scene rendering system 102 may include one or more computing platforms, such as computer servers for example, which may be co-located, or may form an interactively linked but distributed system, such as a cloud based system, for instance. As a result, hardware processor 104 and memory 106 may correspond to distributed processor and memory resources within scene rendering system 102. Thus, it is to be understood that depth determination software 110 and depth buffer 116 may be stored remotely from one another within the distributed memory resources of scene rendering system 102. It is further noted that although FIG. 1 depicts depth buffer 116 as residing in memory 106, in some implementations, depth buffer 116, when completed, may be copied to non-volatile storage (not shown in FIG. 1).

According to the implementation shown by FIG. 1, user 140 may utilize workstation terminal 142 to interact with scene rendering system 102 over communication network 130. In one such implementation, scene rendering system 102 may correspond to one or more web servers, accessible over a packet network such as the Internet, for example. Alternatively, scene rendering system 102 may correspond to one or more computer servers supporting a local area network (LAN), or included in another type of limited distribution network. Moreover, in some implementations, communication network 130 may be a high-speed network suitable for high performance computing (HPC), for example a 10 GigE network or an Infiniband network.

Although workstation terminal 142 is shown as a personal computer (PC) in FIG. 1, that representation is also provided merely as an example. In other implementations, workstation terminal 142 may be any other suitable mobile or stationary computing device or system. User 140 may use workstation terminal 142 to operate scene rendering system 102, under the control of hardware processor 104.

Hardware processor 104 is configured to execute depth determination software 110 including reduced depth set identification software module 112 to determine, before rendering a scene, depth buffer 116, based on one or more fixed depths identified for each element of a rendering framework for the scene. It is noted, that as used in the present application, depth buffer 116 is defined to be a buffer containing one or more depth values per element of a rendering framework for a scene. For example, an element of a rendering framework for rendered scene 122 may be a single frame buffer pixel of display 120 providing rendered scene 122. As explained in greater detail below, the one or more fixed depths may be identified using reduced depth set identification software module 112, based on raw depth data 114. Hardware processor 104 is also configured to render the scene so as to produce rendered scene 122, using depth buffer 116 subsequent to determination of depth buffer 116. In addition, in some implementations, hardware processor 104 is further configured to execute depth determination software 110 to generate raw depth data 114.

Figure 2:
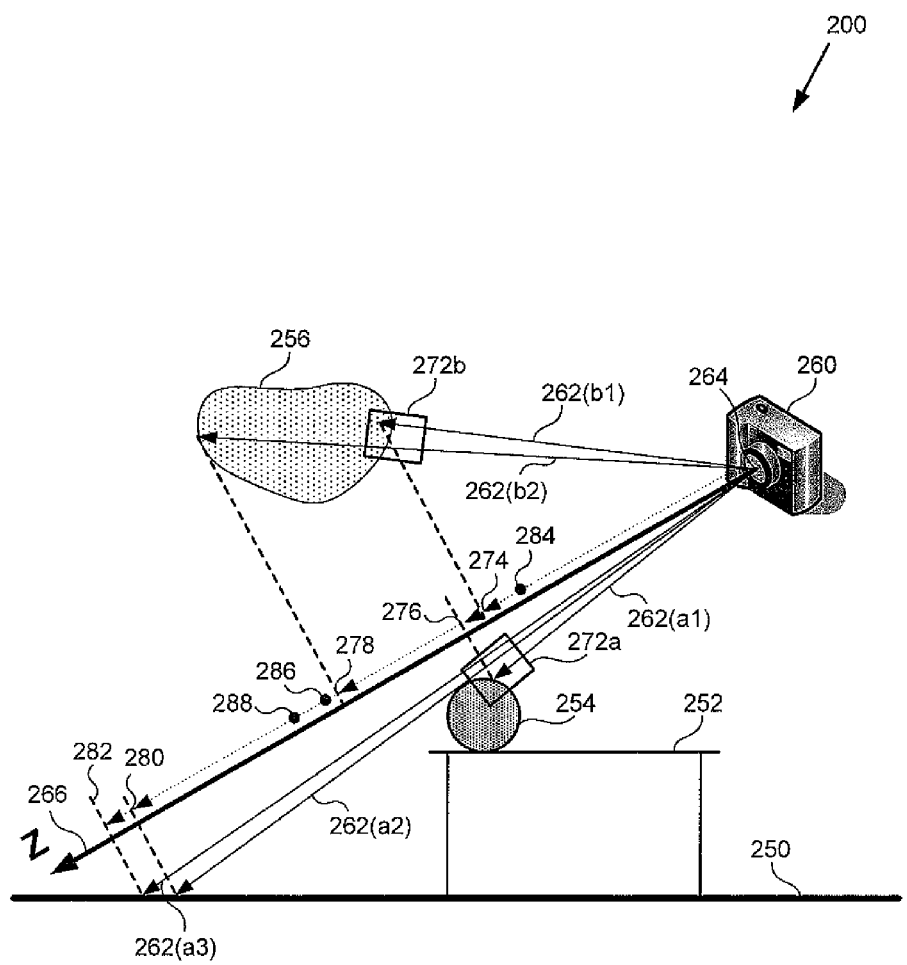
FIG. 2 shows a diagram of a virtual environment depicting interactions of rays utilized in a depth buffering process with virtual objects and a virtual semi-transparent volume within the virtual environment, according to one implementation.

Continuing to FIG. 2, FIG. 2 shows a diagram of virtual environment 200 depicting interactions of rays utilized by a ray tracer in a depth buffering process, according to one implementation. Virtual environment or scene 200 (hereinafter "scene 200") includes perspective camera 260, as well as virtual objects 250, 252, and 254, represented respectively as floor 250, table 252, and sphere 254. In addition, scene 200 includes virtualized semi-transparent volume 256, which may correspond to any of a cloud, a puff of smoke, or a spatially confined grouping of dust particles, to mention merely a few possibilities.

Scene 200 also includes elements 272a and 272b of a rendering framework for scene 200, each of which may correspond to a frame buffer pixel of display 120, in FIG. 1, for example, (hereinafter "pixel 272a" and "pixel 272b"). In addition, scene 200 includes rays 262(a1), 262(a2), 262(a3), 262(b1), and 262(b2) emanating from perspective camera 260 and traced to and through pixels 272a and 272b. That is to say, rays 262(a1) is traced to and through pixel 272a and hits virtual sphere 254, while rays 262(a2), and 262(a3) are traced to and through pixel 272a and hit virtual floor 250. Analogously, rays 262(b1) and 262(b2) are traced to and through pixel 272b and interact with virtualized semi-transparent volume 256.

In addition, FIG. 2 shows Z axis 266, which extends in a direction substantially perpendicular to the plane of lens 264 of perspective camera 260. In other words, Z axis 266 can be used to measure the depth of each of rays 262(a1), 262(a2), 262(a3), 262(b1), and 262(b2), relative to perspective camera 260, as the respective projections of rays 262(a1), 262(a2), 262(a3), 262(b1), and 262(b2) onto Z axis 266. Thus, ray 262(b1) traced to and through pixel 272b has depth 274, while ray 262(b2) traced to and through pixel 272b has depth 278. Analogously, ray 262(a1) traced to and through pixel 272a has depth 276, while ray 262(a2) traced to and through pixel 272a has depth 280, and ray 262(a3) traced to and through pixel 272a has depth 282. Also shown in FIG. 2 are volume threshold depths 284 and 286, and object threshold depth 288, which are described in greater detail below in conjunction with FIG. 3.

It is noted that the size depiction of pixels 272a and 272b relative to scene 200 is exaggerated in FIG. 2 in the interests of conceptual clarity. It is further noted that although only two pixels are expressly identified within scene 200, i.e., pixels 272a and 272b, all or substantially all of scene 200 corresponds to a rendering framework that may include millions of pixels. Moreover, although three rays are shown to be traced to and through pixel 272a, and two rays are shown to be traced to and through pixel 272b in FIG. 2, such representation is for conceptual clarity as well. In practice, the number of rays traced to and through each of pixels 272a and 272b may be quite numerous. That is to say, in other implementations, many more rays may be traced to and through pixel 272a and/or pixel 272b than are shown explicitly in FIG. 2.

Although the exemplary implementation shown in FIG. 2 utilizes perspective camera 260, in other implementations, the functionality provided by perspective camera 260 may be achieved using other features. For example, in one implementation, an orthographic camera, or any other suitable substitute camera type, may be utilized in place of perspective camera 260. In addition, although FIG. 2 represents projection of rays 262(a1), 262(a2), 262(a3), 262(b1), and 262(b2) onto Z axis 266 in the interests of conceptual clarity, in another implementation, the straight line lengths of each of rays 262(a1), 262(a2), 262(a3), 262(b1), and 262(b2) could be utilized directly. In such an implementation, for example, circular arcs centered on perspective camera 260 could be drawn, and the intersections of those arcs with any ray from perspective camera 260 could be determined.

Figure 3:
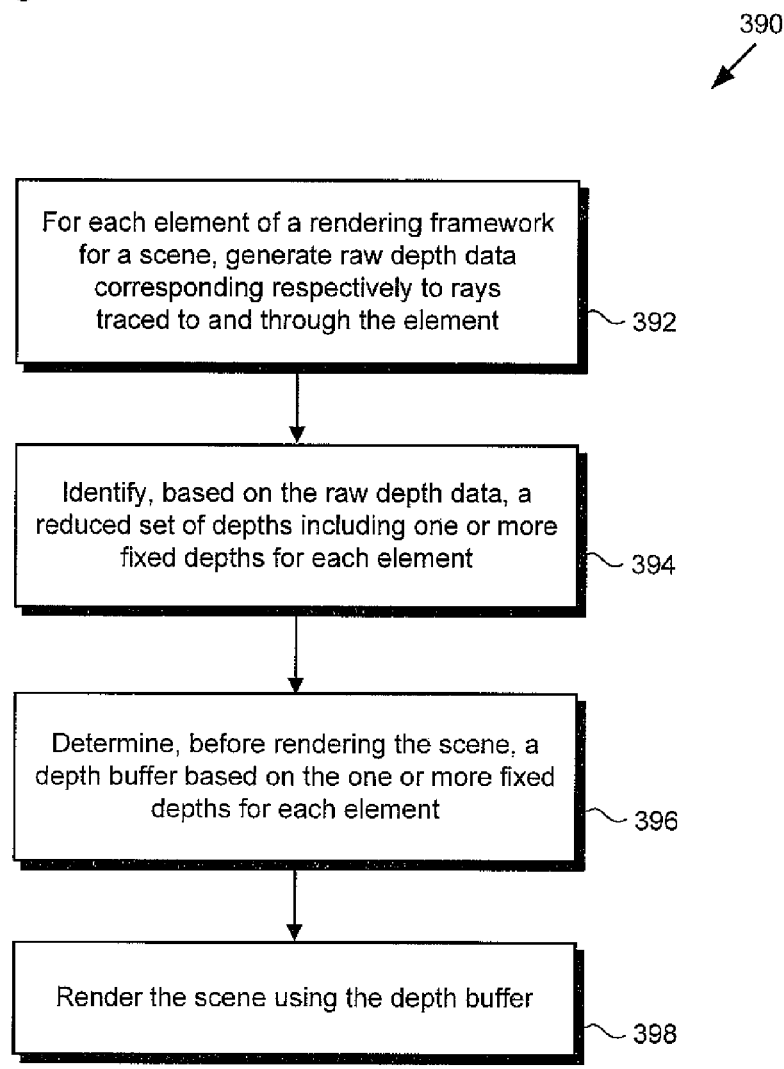
FIG. 3 is a flowchart presenting an exemplary method for performing depth buffering and subsequent scene rendering.

FIGS. 1 and 2 will be further described in conjunction with FIG. 3. FIG. 3 shows flowchart 390 presenting an exemplary method for performing depth buffering and subsequent scene rendering, according to one implementation. It is noted that although the method outlined by flowchart 390 is described as being executed by hardware processor 104, in FIG. 1, in other implementations, the present method may be executed using optional GPU 108, which may also be included as a hardware processor of scene rendering system 102.

Referring to FIG. 3 with additional reference to FIG. 1, flowchart 390 begins with, for each element of a rendering framework for a scene, generating raw depth data 114 corresponding respectively to rays traced to and through the element (action 392). As noted above, for example, an element of a rendering framework for rendered scene 122 may be a single frame buffer pixel of display 120, such as a pixel corresponding to either of pixels 272a and 272b, in FIG. 2. Generation of raw depth data 114 may be performed by depth determination software 110 of scene rendering system 102, executed by hardware processor 104.

A specific example of raw depth data 114 is provided by the respective depths of rays 262(a1), 262(a2), 262(a3), 262(b1), and 262(b2), shown in FIG. 2. With respect to and through pixel 272a, ray 262(a1) traced to and through pixel 272a hits the surface of sphere 254, while rays 262(a2) and 262(a3) traced to and through pixel 272a miss sphere 254 and instead hit floor 250, which is part of the background of sphere 254 relative to perspective camera 260. As a result, raw depth data 114 includes the depths 276, 280, and 282, i.e., the respective projections of rays 262(a1), 262(a2), and 262(a3) onto Z axis 266.

Regarding pixel 272b, ray 262(b1) traced to and through pixel 272b interacts with a front surface of semi-transparent volume 256 closer perspective camera 260, while ray 262(b2) traced to and through pixel 272b interacts with a back surface of semi-transparent volume 256 farther away from perspective camera 260. For example, where semi-transparent volume 256 is a spatially confined grouping of dust particles, ray 262(b1) may be understood to hit a dust particle near the front surface of semi-transparent volume 256, while ray 262(b2) passes through semi-transparent volume 256 until hitting a dust particle near its back surface. As a result, raw depth data 114 includes the depths 274 and 278, i.e., the respective projections of rays 262(b1) and 262(b2) onto Z axis 266.

Moreover, and as stated above, a rendering framework for rendered scene 122 will typically include many more elements than pixels 272a and 272b. In addition, and as also stated above, each such element may have many rays traced to it. Consequently, raw depth data 114 may include the depths of all or substantially all rays traced to each element, i.e., the respective projections of those rays onto Z axis 266.

It is noted that although flowchart 390 includes generating raw depth data 114, that action is merely exemplary. In some implementations, scene rendering system 102 may be configured to receive raw depth data 114 from an external source. For example, in one implementation, scene rendering system 102 may receive raw depth data 114 from user 140, via workstation 142 and communication network 130.

Flowchart 390 continues with identifying, based on raw depth data 114, a reduced set of depths including one or more fixed depths for each element, e.g., pixels 272a and 272b (action 394). Identification of the reduced set of depths including one or more fixed depths for each of pixels 272a and 272b may be performed by depth determination software 110, executed by hardware processor 104, and using reduced depth set identification software module 112.

Considering pixel 272a, as noted above, ray 262(a1) traced to and through pixel 272a hits the surface of sphere 254, while rays 262(a2) and 262(a3) traced to and through pixel 272a miss sphere 254 and instead hit floor 250, which is part of the background of sphere 254 relative to perspective camera 260. Moreover, as is apparent from FIG. 2, all rays traced to and through pixel 272a will either hit the surface of sphere 254 or continue past sphere 254 to the background represented by floor 250. Although the precise depths of other rays traced to and through pixel 272a may vary, it is apparent that those ray depths will cluster around two distinct depths, for example depth 276 and depth 282. As a result, substantially all rays traced to and through pixel 272a have respective depths that may be characterized as being similar to depth 276 or similar to depth 282.

Thus, according to the exemplary implementation shown by FIG. 2, substantially all rays traced to and through pixel 272a can be described by two depths, i.e., depth 276 and depth 282. As a result, depth 276 is identified as a first fixed depth (hereinafter "first fixed depth 276") for pixel 272a and depth 282 is identified as second fixed depth (hereinafter "second fixed depth 282") for pixel 272a.

Although FIG. 2 shows three rays as traced to and through pixel 272a, it is noted that the depths of all rays traced to and through pixel 272a can be described using one of two fixed depths given by first fixed depth 276 and second fixed depth 282. In other words, first and second fixed depths 276 and 282 make up a set of depths (hereinafter "reduced depth set") for pixel 272a that is reduced relative to the set of raw depth data for pixel 272a that further includes at least depth 280.

Moreover, because the depths of rays traced to and through pixel 272a cannot be adequately described by comparison to less than first and second fixed depths 276 and 282, first fixed depth 276 and second fixed depth 282 make up a minimum set of depths (hereinafter "minimum depth set") for pixel 272a. It is noted that although the reduced depth set for pixel 272a includes two fixed depths, other pixels may have respective reduced depth sets including more, or fewer, fixed depths. Thus, according to the present inventive principles, a reduced depth set or a minimum depth set for a frame buffer pixel includes at least one fixed depth, and may include multiple fixed depths.

With respect to and through pixel 272b, as noted above, where semi-transparent volume 256 is a spatially confined grouping of dust particles, ray 262(b1) may be understood to hit a dust particle near the front surface of semi-transparent volume 256, while ray 262(b2) passes through semi-transparent volume 256 until hitting a dust particle near its back surface. In addition, although not explicitly shown in FIG. 2, numerous other rays can be traced to and through pixel 272b that may be understood to hit respective dust particles at various locations in the interior of semi-transparent volume 256. As a result, raw depth data 114 can be expected to include incrementally different depths between depth 274 and depth 278.

Thus, in the case of a semi-transparent volume, the depths of rays traced into the semi-transparent volume can be characterized as having values between depths clustering near depth 274 and depths clustering near depth 278. In other words, rays traced to and through pixel 272b cannot have respective depths substantially less than depth 274 or substantially greater than depth 278. Consequently, the depths of all rays traced to and through pixel 272b can be described by a reduced depth set including two fixed depths given by depth 274 and depth 278. However, in some implementations, it may be advantageous or desirable to utilize hardware processor 104 to execute depth determination software 110 to determine a set of fixed depths for pixel 272b that includes fixed depths between depth 274 and depth 278.

It is noted that although flowchart 390 identification of a reduced depth set for each of pixels 272a and 272b as being performed by depth determination software 110, executed by hardware processor 104, and using reduced depth set identification software module 112, that action is merely exemplary. In some implementations, scene rendering system 102 may be configured to receive a reduced depth set for each of pixels 272a and 272b from an external source. For example, in one implementation, user 140 may manually identify one or more of the fixed depths making up the reduced depth set for pixel 272a and/or one or more of the fixed depths making up the reduced depth set for pixel 272b. Alternatively, or in addition, user 140 may manually identify the maximum number of fixed depths to be included in the reduced depth set for pixel 272b, or any other frame buffer pixel. In those implementations, scene rendering system 102 may receive manual inputs from user 140 via workstation 142 and communication network 130.

Flowchart 390 continues with determining, before rendering scene 122, depth buffer 116 based on the one or more fixed depths identified for each of pixels 272a and 272b (action 396). Determination of depth buffer 116 may be performed by depth determination software 110, executed by hardware processor 104.

In some implementations, determination of depth buffer 116 may include identifying one or more threshold depths for pixel 272a and/or pixel 272b. For example, in some implementations, depth buffer 116 may include the threshold depths identified for pixel 272a and/or pixel 272b. As noted above, FIG. 2 shows volume threshold depths 284 and 286, and object threshold depth 288. According to the implementation shown in FIG. 2, object threshold depth 288 enables classification of any ray depth traced to and through pixel 272a. For example, a ray traced to and through pixel 272a and having a depth less than or equal to object threshold depth 288 may be classified as first fixed depth 276, while a ray traced to and through pixel 272a and having a depth greater than object threshold depth 288 may be classified as second fixed depth 282. In other words, object threshold depth 288 can be used for distinguishing between first fixed depth 276 and second fixed depth 282. It is noted that, in some implementations, object threshold depth 288 may be substantially equidistant from first fixed depth 276 and from second fixed depth 282.

Referring to semi-transparent volume 256, as noted above, all ray depths traced to and through pixel 272b and hitting particles in semi-transparent volume 256 have depths in a range from depth 274 to depth 278. As a result, volume threshold depth 284 can be identified as slightly less deep, i.e., having a location on Z axis 266 that is closer to perspective camera 260, than depth 274, and volume threshold depth 286 can be identified as slightly more deep, i.e., having a location on Z axis 266 that is farther from perspective camera 260. As a result, a ray traced to and through pixel 272b and having a depth greater than volume threshold depth 286 may be interpreted not as contributing to semi-transparent volume 256, but to its background. By analogy, a ray traced to and through pixel 272b and having a depth less than volume threshold depth 284 may be interpreted not as contributing to semi-transparent volume 256, but to its foreground.

Exemplary flowchart 390 may conclude with rendering scene 122 using depth buffer 116 (action 398). The render of scene 122 may be performed by hardware processor 104, using optional GPU 108 and depth buffer 116 determined by depth determination software 110. It is emphasized that depth buffer 116 is determined and fixed prior to rendering of scene 122. That is to say, depth buffer 116 is not dynamically changed during the render of scene 122.

By way of example, in order to render scene 122 using depth buffer 116, a fixed size image buffer containing the identified fixed depths may be allocated per rendering framework element, e.g., frame buffer pixel. Upon intersecting each ray from perspective camera 260 with one of virtual objects 250, 252, and 254, and determining the depth of the ray hit, it can be determined using depth buffer 116 the particular fixed depth to which each ray should contribute. Next, the contribution of each ray may be added to the corresponding sample of the image element.

Referring to FIG. 2, in some implementations, depth buffer 116 is determined before rendering scene 122, for later rendering of object surfaces, such as the surfaces of sphere 254 and floor 250, in scene 122. In other implementations, depth buffer 116 is determined before rendering scene 122, for later rendering of semi-transparent volumes, such as semi-transparent volume 256, in scene 122. In yet other implementations, depth buffer 116 is determined before rendering scene 122, for later rendering of object surfaces and semi-transparent volumes in scene 122.

Thus, the systems and methods for performing depth buffering for subsequent scene rendering disclosed in the present application provide several advantages over conventional approaches to rendering scenes that include deep images. By determining and fixing a depth buffer used to render a scene, before rendering the scene, the solution disclosed in the present application advantageously avoids the high processing and data storage overhead associated with conventional approaches in which depth buffers are changed dynamically during a render. In addition, because the solution disclosed in the present application determines and fixes the depth buffer before rendering the scene, inputs to that fixed depth buffer by human collaborators are preserved, thereby enhancing artistic control of the scene that is subsequently rendered.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A scene rendering system comprising:
a display;
a memory storing a depth determination software; and
a hardware processor configured to execute the depth determination software to:
determine, before rendering a scene, a depth buffer based on at least one fixed depth identified for each element of a rendering framework for the scene, the at least one fixed depth identified based on raw depth data corresponding respectively to rays traced to each element, wherein the at least one fixed depth for each element comprises a depth set reduced relative to the raw depth data for each element; and
the hardware processor is further configured to:
render the scene on the display using the depth buffer.

2. The scene rendering system of claim 1, wherein the depth buffer is determined, before rendering the scene, for later rendering of object surfaces in the scene.

3. The scene rendering system of claim 1, wherein the depth buffer is determined, before rendering the scene, for later rendering of semi-transparent volumes in the scene.

4. The scene rendering system of claim 1, wherein each element of the rendering framework for the scene comprises a frame buffer pixel of the scene.

5. The scene rendering system of claim 1, wherein the hardware processor is further configured to execute the depth determination software to:
generate the raw depth data.

6. The scene rendering system of claim 1, wherein the at least one fixed depth for each element comprises a minimum depth set for each element.

7. The scene rendering system of claim 1, wherein the hardware processor is further configured to execute the depth determination software to: identify a threshold depth for distinguishing between a first of the at least one fixed depth and a second of the at least one fixed depth.

8. The scene rendering system of claim 7, wherein the threshold depth is equidistant from the first of the at least one fixed depth and the second of the at least one fixed depth, and wherein the depth buffer includes the threshold depth.

9. The scene rendering system of claim 1, wherein the hardware processor is further configured to render the scene using the depth buffer by:
allocating a fixed size image buffer containing the at least one fixed depth identified for each element of the rendering framework for the scene;
determining, upon intersecting each of a plurality of rays with a virtual object in the scene, the depth of each ray intersection;
determining, using the depth buffer, each of the at least one fixed depth to which each of the plurality of rays should contribute.

10. A method for use by a scene rendering system including a hardware processor, a display and a memory having stored therein a depth determination software, the method comprising:
determining, by the hardware processor executing the depth determination software, before rendering a scene, a depth buffer based on at least one fixed depth identified for each element of a rendering framework for the scene, the at least one fixed depth identified based on raw depth data corresponding respectively to rays traced to each element, wherein the at least one fixed depth for each element comprises a depth set reduced relative to the raw depth data for each element;

rendering the scene on the display, by the hardware processor, using the depth buffer.

11. The method of claim 10, wherein the depth buffer is determined, before rendering the scene, for later rendering of object surfaces in the scene.

12. The method of claim 10, wherein the depth buffer is determined, before rendering the scene, for later rendering of semi-transparent volumes in the scene.

13. The method of claim 10, wherein each element of the rendering framework for the scene comprises a frame buffer pixel of the scene.

14. The method of claim 10, further comprising generating, by the hardware processor using the depth determination unit, the raw depth data.

15. The method of claim 10, wherein the at least one fixed depth for each element comprises a minimum depth set for the element.

16. The method of claim 10, further comprising identifying, by the hardware processor using the depth determination software, a threshold depth for distinguishing between a first of the at least one fixed depth and a second of the at least one fixed depth.

17. The method of claim 16, wherein the threshold depth is equidistant from the first of the at least one fixed depth and the second of the at least one fixed depth, and wherein the depth buffer includes the threshold depth.

18. The method of claim 10, wherein the rendering of the scene using the depth buffer comprises:
allocating a fixed size image buffer containing the at least one fixed depth identified for each element of the rendering framework for the scene;
determining, upon intersecting each of a plurality of rays with a virtual object in the scene, the depth of each ray intersection; and
determining, using the depth buffer, each of the at least one fixed depth to which each of the plurality of rays should contribute.

* * * * *